United States Patent
Saranka (10) Patent No.: US 6,314,085 B1
(45) Date of Patent: Nov. 6, 2001

(54) CONNECTION ADMISSION CONTROL IN BROADBAND NETWORK

(75) Inventor: Sari Saranka, Espoo (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/386,827

(22) Filed: Aug. 31, 1999

Related U.S. Application Data (63) Continuation of application No. PCT/FI98/00193, filed on Mar. 4, 1998.

(30) Foreign Application Priority Data

Mar. 10, 1997 (FI) .......................................... 970998

(51) Int. Cl.⁷ .............................. H04J 3/17; H04L 12/56
(52) U.S. Cl. ............................................ 370/230; 370/252
(58) Field of Search .................................... 370/230, 231, 370/232, 233, 234, 252

(56) References Cited

U.S. PATENT DOCUMENTS

| | | |
|---|---|---|
| 5,132,966 | 7/1992 | Hayano et al. . |
| 5,166,894 | 11/1992 | Saito . |
| 5,432,790 | 7/1995 | Hluchyj et al. . |
| 5,434,848 | 7/1995 | Chimento, Jr. et al. . |
| 5,583,857 | 12/1996 | Soumiya et al. . |
| 5,602,830 * | 2/1997 | Fichou et al. ..................... 370/232 |
| 5,694,554 * | 12/1997 | Kawabata et al. ................. 395/250 |
| 5,754,529 | 5/1998 | Heiss . |
| 5,936,940 * | 8/1999 | Marin et al. ....................... 370/232 |
| 5,982,748 * | 11/1999 | Yin et al. ........................... 370/232 |
| 5,991,265 * | 11/1999 | Lincoln ............................... 370/229 |
| 6,058,114 * | 5/2000 | Sethuram et al. ................. 370/397 |
| 6,075,770 * | 6/2000 | Chang ................................ 370/230 |

FOREIGN PATENT DOCUMENTS

| | | |
|---|---|---|
| 0 658 999 A2 | 6/1995 | (EP) . |
| WO 95/19077 | 7/1995 | (WO) . |
| WO 95/28787 | 10/1995 | (WO) . |
| WO 97/01895 | 1/1997 | (WO) . |
| WO 97/14240 | 4/1997 | (WO) . |

OTHER PUBLICATIONS

*Performance Evaluation and Design of Multiservice Networks*, COST 244 Final Report Commission of European Communities, Information Technologies and Sciences, Luxembourg, 1992, pp. 108–110 and 154–155.

* cited by examiner

Primary Examiner—Min Jung
(74) Attorney, Agent, or Firm—Altera Law Group, LLC (57) ABSTRACT

A traffic source requesting connection states about itself in accordance with the ATM specification the PCR (Peak Cell Rate), the SCR (Sustainable Cell Rate,) the BT (Burst Tolerance) and the desired probability of cell loss $P_{LOSS}$. The CAC function uses these parameters for computing certain parameter ratios. These computed parameters or corresponding parameters closest to these are sought from a pre-formed table and the same table is studied to find out the equivalent capacity corresponding to the parameters. This capacity is named as the equivalent capacity of the source requesting connection and the source is allowed access and permission to send, if there is free link capacity. Otherwise the request is dismissed. The equivalent capacities of the table are defined by using large deviation approximation which is known as such and which has been developed for a bufferless queue and for homogenous traffic. Differing from the known method, the number of cells arriving at the same time is not observed but the distribution of the number of cells arriving during the time 2.T is observed. The time T depends on the buffer length B and on the capacity C of the output link and it is defined as T=B/C.

11 Claims, 4 Drawing Sheets

CONNECTION ADMISSION CONTROL IN BROADBAND NETWORK

This application is a continuation of PCT/FI98/00193 filed Mar. 4 1998.

FIELD OF THE INVENTION

This invention concerns control of data transmission connections in broadband networks. The invention especially concerns connection admission in an ATM network junction.

TECHNICAL BACKGROUND

In ATM (ATM=Asynchronous Transfer Mode) information is transferred in cells consisting of headers of 5 bytes each and of an information part of 48 bytes. Header fields are e.g. VPI (Virtual Path Indicator) and VCI (Virtual Channel Indicator). The standard size of cells allows quick connecting of the cells. Cell channelling is asynchronous and time-divided. Before the data transfer step proper, a virtual connection is formed through the network, and the cells generated by the user are routed through this virtual connection. Upon completion of the data transfer, disconnection is performed.

A virtual bus level connection and a virtual channel level connection can be distinguished in the network. In the VP (Virtual Path) connection virtual buses are connected between transfer connections. On a virtual bus e.g. a direct connection may be formed between two exchanges, even though the connection passes through other exchanges. The virtual bus contains several virtual channels and in the VC (Virtual Channel) connection virtual channels are connected between virtual buses.

Connection Admission Control or CAC is a set of procedures intended to limit the load caused by sources wishing to enter the network and the load of internal connections in such a way that a guaranteed QOS (Quality of Service) is preserved for each existing connection. The equivalent capacity required by the virtual bus or physical connection must be defined computationally in the connection admission control. If all traffic descriptors of a requested connection are known, the only duty is to determine how much standby capacity there is in the virtual path or physical connection for admission of a new connection without any resulting loss for existing connections.

It is agreed at present that a traffic source requesting connection shall always state at least its PCR (Peak Cell Rate), its SCR (Sustainable Cell Rate), its BT (Burst Tolerance) and the CDVT (Cell Delay Variation Tolerance). In addition, the probability P(on) with which it transmits can be estimated.

However, it is often the case that the "band width" or capacity required by the requested connection is not standard and only depending on the traffic descriptors of this concerned connection, but it depends on the character and volume of the traffic of other virtual channels, which channels share the same virtual bus and physical link. Besides, it is next to impossible to get to know the exact traffic descriptors of sources: it is difficult to characterise the traffic brought about by a work station working in a multiprocessor environment and how the traffic varies with the application.

The equivalent capacity of a virtual channel is that lowest capacity which is needed to ensure QOS for all virtual connections sharing the same virtual bus, should a new request be admitted. Since the equivalent capacity depends on the traffic of all connections, it is difficult to compute the necessary standby capacity and to determine whether there is sufficient standby capacity or not.

Figure 1A:
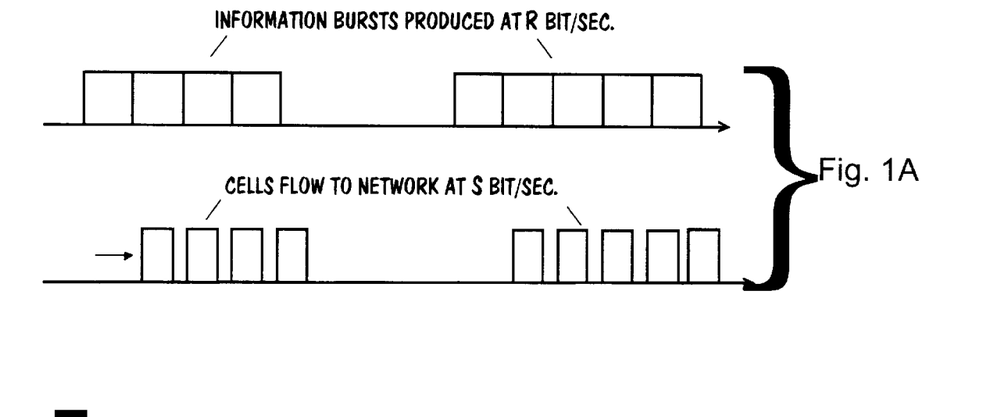
FIGS. 1A and 1B illustrate equivalent capacity.
Figure 1B:
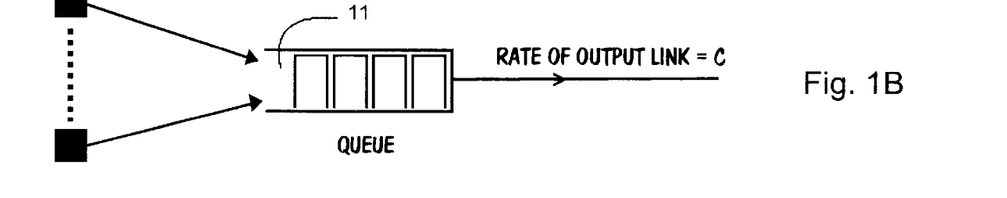

FIGS. 1A and 1B are used to illustrate how difficult it is to determine equivalent capacity. It is assumed that each traffic source has the same traffic descriptors and they transmit cells in bursts: in the "on" state, the source generates information at standard bit rate R bit/s, while in the "off" state it does not generate information, top part of the figure. ATM cells are generated from the information when the source is in the "on" state, bottom part of FIG. 1A, so in this state the rate of ATM cells is the said R bit/s. At the ATM access gate the reception rate of cells is S. Thus, the continuous flow of cells generated by the source in the "on" state is seen at the access gate of the network as a quasi periodic sequence of ATM cells while the average time of arrival is one cell for each S/R time slot. In the off state no cells will arrive.

The following is a description of multiplexing of N different sources into a common virtual bus, FIG. 1B. The input gate has a buffer 11, which stores such cells in a queue which can not be forwarded at once to the output link having a finite capacity C. If the buffer size is infinite, then the minimum rate of the output link must be equal to the mean rate of cells arriving from N sources, which is N×R×P(on), wherein P(on) is the probability of cells being transmitted by the source. If the buffer is very small, it is safest to use a top rate as the effective band for the source, which would hereby also be an unconditional top limit for the reserved capacity. Thus, the equivalent capacity required for multiplexing N sources at the same time maintaining only a small buffer overflow possibility, N×R (equivalent capacity is N times the top rate of the source). It follows from these, that when using a buffer of a moderate size the equivalent capacity needed for multiplexing N sources is somewhere in a range between N×R×P(on) and N×R.

It is very difficult to determine the equivalent capacity when traffic of different types and having a complicated source model is multiplexed into the same virtual channel.

The connections needed by many traffic sources are bursts, whereby the transfer capacity required at some moment is high while the capacity required at another moment is small. Bursts may be described as a phenomenon where a set of cells (a burst) arrives at short intervals and the following set (burst) arrives after a relatively long time. Since different connections need different capacities and the need varies quickly, statistic channelling is used in an ATM network. The statistic characteristics of burst-like traffic sources is utilised in the channelling: when combining a large set of traffic sources the combined traffic will behave in a more stable manner than individual sources and although the transmission speed of individual sources varies, the combined transmission speed of mutually independent individual sources is almost standard. By using statistic channelling it is possible with the same resources to serve more connections, that is, the utilisation rate of the network can be raised.

In spite of statistic channelling, congestion and overloads will occur in the network. Congestion in a broadband network means such a state of network elements, wherein the network is unable to fulfil required performance objectives. Overload again means a situation where performance objectives can still be achieved even though the performance has decreased. Congestion and overload are caused both by unpredictable statistic variations in the traffic and by failure situations occurring in the network. Since it is still impossible to know with sufficient exactness network services, the volume of traffic brought about by them and the exact characteristics of traffic sources, the occurrence of congestion situations is unavoidable in the network. The purpose of traffic control and congestion situation control is to protect the network and the user so that the desired quality of network service is achieved. Traffic control exists when the activity is preventive and it is intended to prevent the occurrence of congestion situations. Control of congestion situations for its part reacts to congestion situations observed in the network. Most significant from the viewpoint of service quality are such traffic control functions which will prevent beforehand congestion situations from occurring. The CAC (Connection Admission Control) belonging to these functions is the most important preventive traffic control method. Functions relating to connection admission control attend to routing of connections, they make decisions on connection admission, they reserve the necessary resources and they set traffic parameters monitored by UPC (Usage Parameter Control) and by NPC (Network Parameter Control). The simplified result of CAC is "yes" or "no"—the new virtual connection can be either admitted or not admitted.

The literature presents several different methods of implementing connection admission control, CAC. In these the criterion is the probability either of losing cells or of filling the buffer and they are based either on traffic parameters stated by the user according to definitions of the ITU or ATM-Forum or on traffic measurements taking place in the network junction. It is possible to estimate the quality of service or the capacity requirement which can be expected according to traffic parameters either with the aid of pre-computed tables as in so-called indirect methods or by doing computing in real time based on traffic parameters of the connection, on the characteristics of other traffic and on available resources, as is done in so-called direct methods. Traffic parameters defined by ATM-Forum and indicating the traffic of the connection are: the peak cell rate (PCR), sustainable cell rate (SCR), maximum burst size (MBS), cell delay variation tolerance (CDVT) and minimum cell rate (MCR).

In measurements it is possible to measure cells arriving within a fixed period of time: the peak rate, the sustainable rate, the maximum number of arrivals, the average value and the variance. Based on these one can estimate the probability of bursts by observing the traffic in connections or one can estimate the probability of cell losses.

The method of reserving capacity based on the peak rate of the traffic source is a simple method very suitable for sources transmitting at a standard rate.

In the method based on convolution, the characteristics of all traffic sources are used for calculating the distribution of band widths of connections and this is compared with available resources. Due to the great number of variables, computing is heavy when there are many connections. In theory, this method gives an accurate result.

In the method based on effective capacity, capacity is reserved according to the traffic source's effective capacity which is estimated in one way or another. However, it is not possible to define any exact capacity for the connection, because the size of the effective band depends not only on traffic source characteristics and on the desired cell loss ratio but also on multiplexer and background traffic characteristics.

Methods based on effective variance use the sustainable rate of connections and the sustainable rate variance as their criteria. These methods give a slightly better resource utilisation ratio than methods using effective capacity.

In two-level methods quick decisions on connection admission are made in real time at the lower level by using some suitable algorithm. The upper level need not function for each call in real time, so it may at times determine the correctness of the lower level function with the aid of a more precise model.

An admission method which has been proposed for use in the case of a buffer-less queue is presented in the publication Performance Evaluation and Design of Multiservice Networks, COST 244 Final Report Commission of European Communities, Information Technologies and Sciences, Luxembourg, 1992, pages 108–110 and 154–155. It is based on a mathematical method called Large Deviation Approximation which is known from other contexts. The idea of the application of the referred method is to make sure that the probability that the sum of momentary arrival rates of cells multiplexed from sources will exceed the output link capacity is less than or equal to the permissible probability of cell loss.

Despite the fact that several different theoretical models have been proposed for implementation of connection admission control, CAC, application of them in practice has proved difficult due to the necessary complex computing. Most CAC models are concerned with the case of one buffer, and so far no such feasible admission model for a connection with several buffers has been presented wherein there are ATM cells with different priority in the buffers. The presented models with several buffers do not allow any division of capacity between buffers but parallel buffers are implemented like several individual buffers. In other words, if a buffer does not use all of its capacity, this is not automatically available to others.

It is an objective of the present invention to find a method of connection admission control CAC, which is as simple as possible and which is especially suitable for use together with burst-like sources when their cells are directed to a junction provided with a buffer and which will make sure a high admission of the requested connection. Decision-making should be prompt and require a minimum of real time computing.

The established objective is achieved with the definitions presented in the independent claims.

BRIEF SUMMARY OF THE INVENTION

The method estimates the capacity required by the requesting source as a function of the following traffic parameters stated by the source: PCR (Peak Cell Rate), SCR (Sustainable Cell Rate), maximum burst size (MBS), desired probability of cell loss $P_{LOSS}$ and the output link capacity and buffer size, which two latter are independent of the source. The name burst tolerance or BT is used hereinafter in this text for the maximum burst size.

The traffic source requesting connection makes known about itself according to the specification the PCR (Peak Cell Rate), the SCR (Sustainable Cell Rate), the BT (Burst Tolerance) and the desired probability of cell loss $P_{LOSS}$. The CAC function computes certain parameter ratios with the aid of these parameters. A table has been formed in advance, which contains corresponding parameter ratios, and these computed parameters or such corresponding ones which come closest to them are sought from the table and the same table is studied to find out the equivalent capacity corresponding to the parameters. This capacity is named as the equivalent capacity for the source requesting connection and the source is admitted access and permission to send, if there is free capacity in the link. Otherwise the request is dismissed.

The equivalent capacity in the table is determined by using an approximation with large deviation which is known as such and which has been developed for a buffer-less queue and for homogeneous traffic. It is assumed in this known approximation that all traffic sources are homogeneous and that no buffer is used. With a given link capacity and given traffic source parameters (same for all), the number of permissible connections can be computed for different $P_{LOSS}$ values. The band of one connection is obtained by dividing the link capacity with the resulting number of connections. However, the known approximation is applied in such a way to a buffered case, that parameter ratios instead of source parameters as such are used in the computation algorithms:

Link capacity/peak cell rate,

Sustainable cell rate/peak cell rate,

Buffer size/burst tolerance.

Differing from the known method, the number of cells arriving at the same time is not studied, but the division in the number of cells arriving during the time $2 \cdot T$ is studied. Time T depends on the buffer length B and on the output link capacity C and it is defined $T=B/C$.

A line in the formed table comprises parameter ratios mentioned above and the value of probability of cell loss and the last figure on the line shows the effective capacity computed by using line values. Thus, a table with many lines is a combination of numerous connections of different types and of their effective capacities.

BRIEF DESCRIPTION OF THE DRAWINGS

The invention will be described in the following with the aid of appended schematic figures, of which

DETAILED DESCRIPTION OF THE INVENTION

Figure 3:
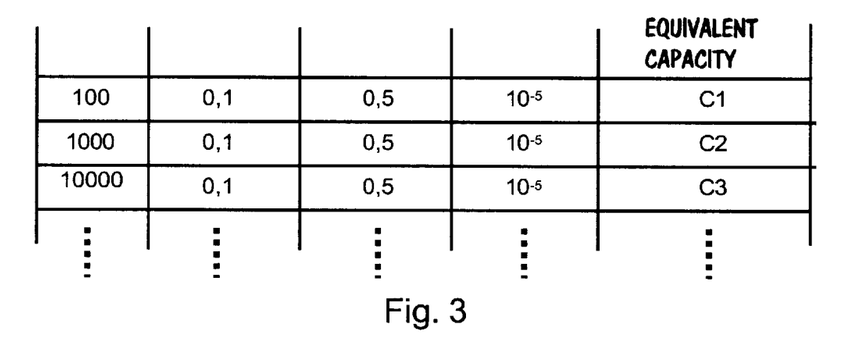
FIG. 3 shows a table for determination of capacity.

FIG. 3 shows a simplified table model, which is used in connection admission control according to the invention. The table is formed in advance using a method known per se by the name of large deviation approximation. Application of the method to connection admission control is described in the publication Performance Evaluation and Design of Multiservice Networks, COST 244 final report Commission of European communities, information technologies and sciences, Luxembourg, 1992, pages 108–110 and 154–155. However, deviating from the known method presented in the publication, the invention proceeds in such a way that instead of in a bufferless case studying the number of cells arriving at the same time a buffered case and the division of the number of cells arriving during the time $T'=2 \cdot T$ are studied. Time T depends on the buffer length and on the output link capacity and it corresponds to the time in which the buffer is filled, that is, $T=B/C$.

Figure 2:
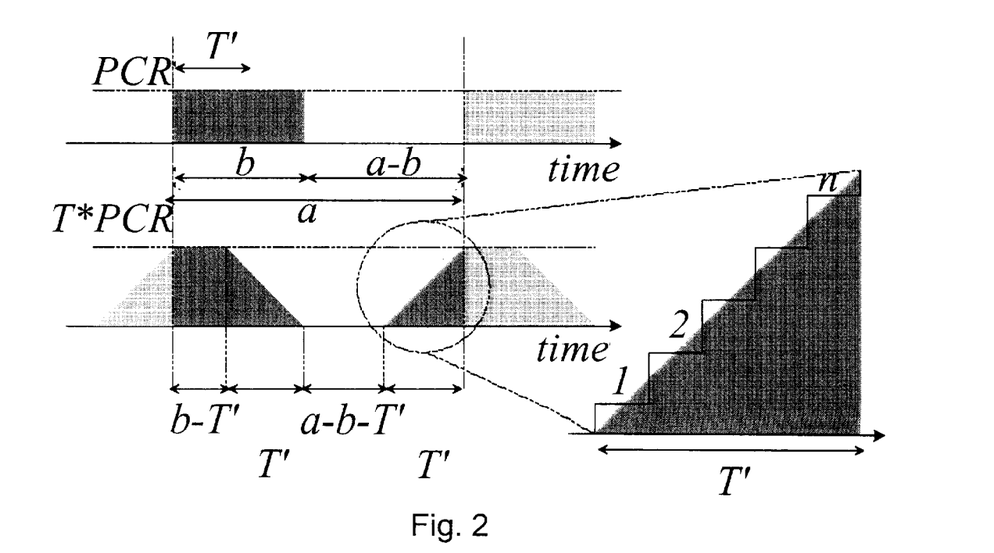
FIG. 2 shows the number of cells as the function of the start time T' in the time table.

Reference is made to FIG. 2. Its top part presents the on/off period of one source, in which on period the source sends cells at peak cell rate PCR, while the lower part shows the quantity of traffic arriving from this source as a function of the start point in time period T'. The following markings are used:

BT=burst tolerance (as cells)

PCR=peak cell rate (cell/s)

SCR=sustainable cell rate (cells/s)

a=BT/SCR is the duration (s) of the on/off period(s)

b=BT/PCR is the burst duration(s)

a–b is the duration of time between bursts(s)

Figure 4:
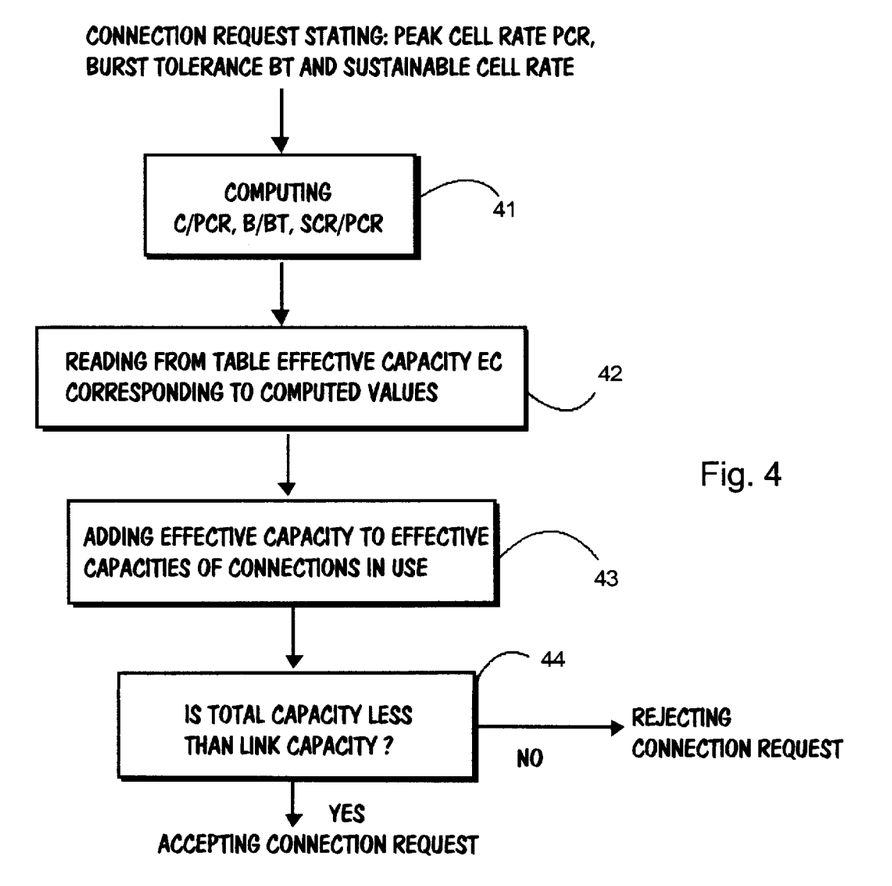
FIG. 4 shows CAC decision-making.

If a burst occurs entirely within time period T', the number of cells arriving in the buffer is equal to $T' \cdot PCR$. Correspondingly, if time period T' is entirely in between bursts, the number of incoming cells is zero. The case wherein a part of the burst occurs in time period T' and a part of their vacant time in between, may be processed as a step function with n steps. The number n is chosen as equal to the burst size in cells. The enlarged part in the right side of FIG. 4 shows the step function.

It is assumed in the following that time period T' is shorter than b and shorter than a–b, FIG. 4. The following conclusion is a probability of cell loss expression applying the known large deviation approximation. The number of cells arriving in time period T' is a random variable X, the Laplace conversion is calculated as follows in a case of N independent and identical sources:

$$\psi(\beta) = ([E\{e^{\beta X}\}])^N \quad (1)$$

$$= \left( \left[ K_1 \cdot e^{\beta \cdot T' \cdot PCR} + K_2 + K_3 \sum_{i=1}^{n} e^{\beta \cdot PCR \cdot [T'-t(i)]} \right] \right)^N,$$

wherein $t(i) = \frac{1}{2} \cdot \frac{(2 \cdot i - 1) \cdot T'}{n}$ and $\quad (2)$ $$K_1 = \frac{b - T'}{a}$$

$$K_2 = \frac{a - b - T'}{a}$$

$$K_3 = \frac{2T'}{n \cdot a}.$$

Index i refers to steps of the step function. The following markings are used in order to simplify the formulas:

$$\mu(\beta) = \ln \psi(\beta) \quad (3)$$

$$D_1(\beta) = K_1 \cdot e^{\beta \cdot T' \cdot PCR} + K_2 + K_3 \cdot \sum_{i=1}^{n} e^{\beta \cdot PCR \cdot [T'-t(i)]} \quad (4)$$

$$D_2(\beta) = D_1'(\beta) = K_1 \cdot T' \cdot PCR \cdot e^{\beta \cdot T' \cdot PCR} + \quad (5)$$

$$K_3 \cdot \sum_{i=1}^{n} PCR \cdot [T' - t(i)] \cdot e^{\beta \cdot PCR \cdot [T'-t(i)]}$$

$$D_2'(\beta) = K_1 \cdot (T' \cdot PCR)^2 \cdot e^{\beta \cdot T' \cdot PCR} + \quad (6)$$

$$K_3 \cdot \sum_{i=1}^{n} [PCR \cdot [T' - t(i)]]^2 \cdot e^{\beta \cdot PCR \cdot [T'-t(i)]}$$

Formulas (1) and (3) result in:

$$\mu(\beta) = N \cdot \ln\{D_1(\beta)\} \quad (7)$$

Formulas for the mean value m(β) and the variance σ²(β) are obtained as the first and second derivatives of formula (7):

$$m(\beta) = \mu'(\beta) = N \cdot \frac{D_2(\beta)}{D_1(\beta)} \quad (8)$$

and $$\sigma^2(\beta) = \mu''(\beta) = N \cdot \frac{D_1(\beta) \cdot D'(\beta)_2 - D_2^2(\beta)}{D_1^2(\beta)}. \quad (9)$$

β is a free parameter which is used for transferring the mean value of distribution into the desired probability of cell loss (e.g. into value $10^{-9}$). As the optimum value of parameter β, β* is entered, that is:

$$m(\beta^*) = C \quad (10)$$

wherein C is the output link capacity.

The referred literature gives the following approximation as the probability of cell loss $P_{LOSS}$:

$$P_{loss} \approx \frac{1}{\sqrt{2\pi} \, m\beta^{*2}\sigma(\beta^*)} e^{-\beta^*C + \mu(\beta^*)}, \quad (11)$$

wherein m is the rate of arriving cells, that is, m=N·SCR and μ(β*) while σ(β*) is obtained from formulas (7) and (9).

The number of admitted connections is now obtained in an iterative manner from formulas (10) and (11). In iteration, such parameter values N and σ(β*) are sought that the desired probability of cell loss is achieved.

Table 3 is now formed in such a way that parameter values BT, PCR, SCR, B, C are given as well as the desired probability of cell loss value $P_{LOSS}$. The value T is chosen as B/C, whereby the computation time window is T'=2T.

With these values the number N of connections admitted with the described procedure is computed. From that the effective capacity EC of one connection is calculated by dividing the output link capacity C with the obtained number N. By changing the numerical value of the parameters and the probability value $P_{LOSS}$ the result is the desired number of traffic cases of different types and the effective capacity EC of the connection corresponding with these EC.

The parameters on each horizontal line of Table 3 always describe a connection of one type while the last column gives the equivalent capacity suitable for the connection which has the parameters of the horizontal line. The first parameter on the horizontal line is the link capacity C divided with the peak cell rate value PCR, the second parameter is the buffer size B divided with the burst tolerance BT, the third value P(on) indicates the probability of transmission from the source. The assumed probability is the sustainable cell rate SCR divided with the peak cell rate value PCR. The fourth value $P_{LOSS}$ shows the probability of cells being lost and the source states this value. The last value is the equivalent capacity EC computed for the parameters of the horizontal line. So, for the connection of the first line, for which C/PCR=100, B/BT=0,1, P(ON)=0,5 and $P_{LOSS}=10^{-5}$ have been computed, the equivalent capacity is C1. Correspondingly, for the connection of the second line the equivalent capacity is C2, for the connection of the third line the equivalent capacity is C3 etc.

FIG. 4 shows a block diagram of the operation in a case where the junction has one reception buffer, to which cells arriving from several sources are multiplexed. All incoming cells are of equal priority, The buffer is thus as shown in FIG. 1B. A new source requests capacity for sending cells and in connection with its request it has stated values according to the standard: the PCR (Peak Cell Rate), the SCR (Sustainable Cell Rate) and the BT (Burst Tolerance) as well as the probability of cell loss value $P_{LOSS}$.

In response to the request, the connection admission control CAC performs the function shown in FIG. 4. First, it computes the following ratios with the aid of the information it has received, block 41:

1. Link capacity C/peak cell rate value PCR
2. Buffer size B/burst tolerance BT
3. Sustainable cell rate SCR/peak cell rate value PCR. This ratio indicates the source's probability P(on) of transmission from the source.

The probability of cell loss value $P_{LOSS}$ it obtains from the source.

After the ratio computation, the CAC searches the pre-made table according to FIG. 3 for the effective capacity corresponding to the computed values, block 42. If exactly similar values are not found in the table, then those values are chosen which come nearest. The obtained effective capacity is added to the sum of capacities given to sources sending cells in the junction, block 43.

If the parameter ratios computed from parameters given in the connection request are not found directly in the table, rounding off may be done as follows: C/PCR is rounded off downwards to the closest value found in the table (=towards a larger connection), SCR/PCR is rounded off upwards (=greater probability of the connection being on), B/BT is rounded off downwards (=bigger burst size) and $P_{LOSS}$ is rounded off downwards (=stricter quality requirements).

A decision is then made, block 44: if the sum is less than the link capacity C, the requested connection is admitted, and if the sum exceeds the link capacity C, the source will not have the connection it requested.

The above was a study of the inventive principle in a case of a single priority queue. The principle is suitable for use also in a case where there are several queues of different priorities.

Figure 5:
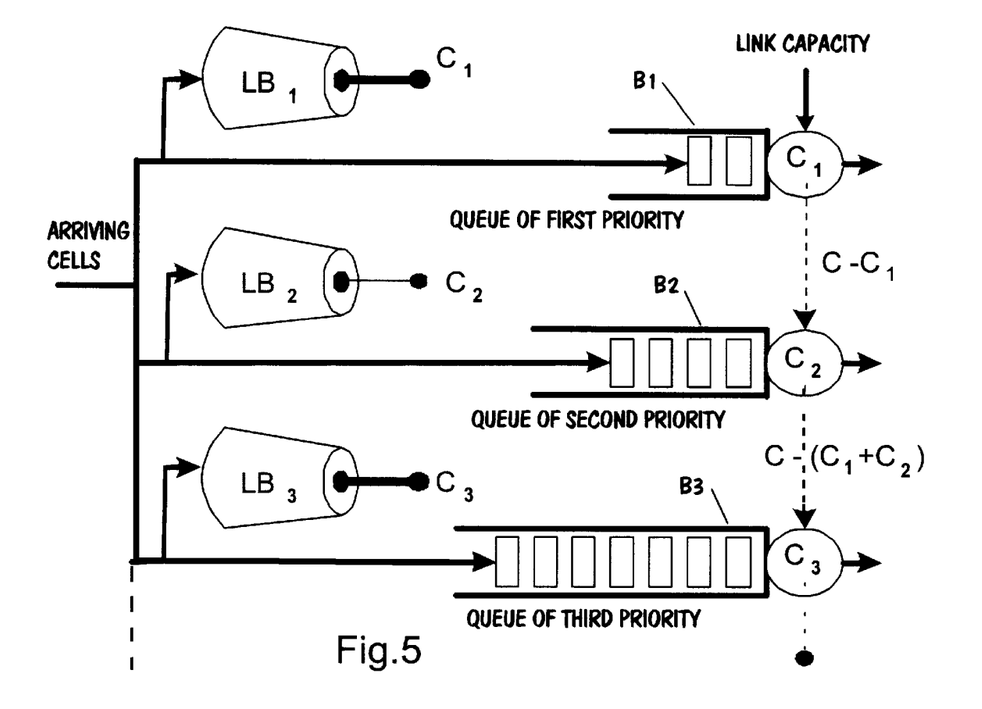
FIG. 5 shows application of the invention to a case with many buffers.

FIG. 5 illustrates such a case. Incoming cells of different priorities are directed into different buffers according to their priority. The buffers thus serve cells corresponding with their service level. Cells may come from some junction in the network or from different traffic sources, and they are multiplexed from the buffers to the output link. The figure shows buffers B1, B2 and B3. In addition, each input buffer is associated with an LB (Leaky Bucket), which is used for monitoring and controlling the traffic flow of cells belonging to different classes of priority. The leaky buckets are calculators and they may be used also for performing traffic measurements. The significance of leaky buckets in connection with the present invention will be described later in greater detail.

Priorities are absolute, that is, services are always offered to the queue of top priority and if no cells are waiting for transmission in this queue, then the service will be offered to the queue of the next lower priority etc., all the way to the queue of lowest priority.

The idea is to attach to each buffer a standard capacity share of the output link capacity C and at each buffer a CAC decision is made independently using the table according to the invention, FIG. 3, which has been drawn up taking into account the length B of the concerned buffer and the standard capacity share allocated to the buffer. Shares may be changed when desired. Thus, capacity C1 is available to the first buffer, C2 to the second, C3 to the third etc., whereby the buffers have a capacity total of C1+C2 . . . +$C_n$=C. When it is made sure according to the invention that the number of cells arriving at buffer B1 of first priority cells in time window 2·T will not exceed a number of 2·B1, wherein B1 is the buffer length, it is made sure at the same time, that the number of cell time slots of the link taken in the time 2·T of the cells of the first priority queue is 2·B1, so during the time window the remaining cell time slots of the link are available to queues of a lower priority. By making sure that connections of top priority use the 2·B transmission time slot in the time 2T, then the remaining transmission time slots will be available to lower priority queues. The link capacity C is thus bigger than the capacity C1=B1/T used by top priority connections. However, if cells arrive, they will be eliminated and are not admitted into the buffer. It follows from the above that the length of lower priority buffers must be 2·B1 or a multiple of 2·B1, because traffic behaviour is studied only in periods of 2T and nothing can be made sure for shorter periods.

Figure 7:
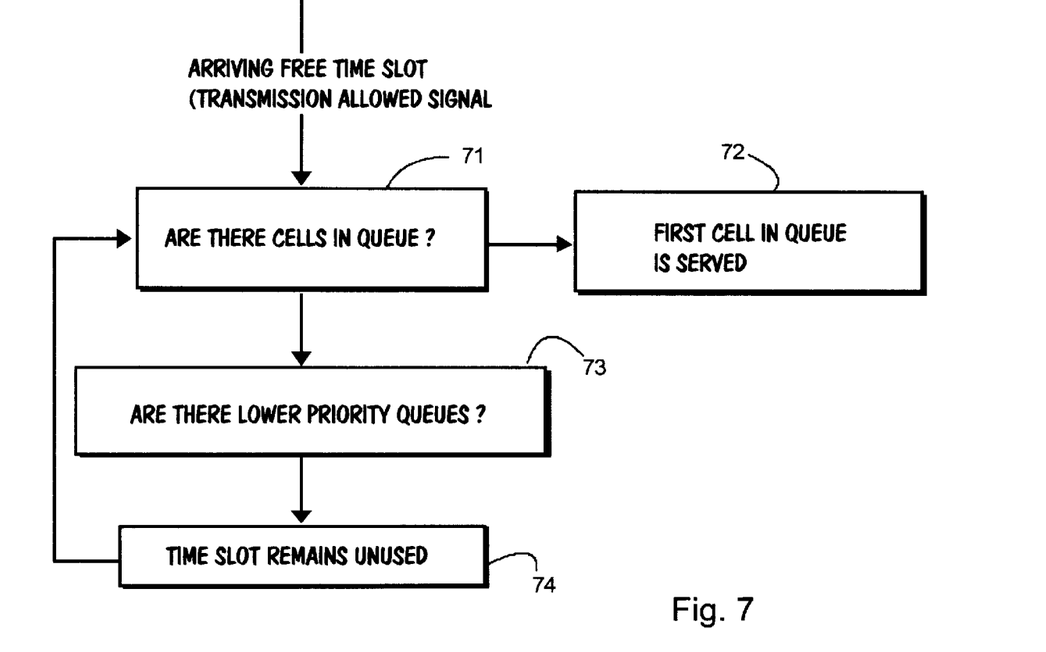
FIG. 7 shows division of capacity in a case with many buffers.

FIGS. 5 and 7 are referred to in the following. Of cells of different priorities each one arrives at a buffer B according to its respective priority. For each buffer a standard capacity is allocated from the total capacity C of the output link, that is, a standard number of time slots. When the transmission control related to buffer B1receives the signal "transmission allowed", which means that the next time slot is free and transmission can take place in it, step 71 in FIG. 7, it transmits a cell from this buffer, step 72. If in the buffer B1 of the highest priority there are less cells than the number of cells which the time slots allow to be transmitted, then the unused time slots are made temporarily available to cells of the next priority, that is, to buffer B2, if there are cells in the buffer waiting for transmission, step 72. Furthermore, if this buffer also has less to be transmitted than the number of time slots allocated to it, then any unused time slots and any time slots not used by B1 are made available to the following buffer. The procedure is the same with all buffers. If there is nothing to be transmitted in any buffer of a lower priority, then the transmission time slot remains unused. With the described function cells of a certain priority may temporarily have more capacity at their disposal than what is fixedly allocated to themselves.

CAC decisions of connections belonging to different priority classes are independent of each other. The CAC units relate logically to priority queues and each unit serves one queue only and sees that link capacity only, which is allocated to the queue in question. However, CAC decisions are based on the same criterion which is independent of priority classes and which was described in connection with FIGS. 3 and 4. For this reason, all CAC units may use the same table of the type shown in FIG. 3. This is true, since if parameter ratios are used in the table, then one of them is the buffer length and burst tolerance ratio, which is not directly dependent on the buffer size. For example, the buffer size may be 100 and the burst size 10, whereby the ratio is 10. The same ratio is obtained, if the buffer size is 1000 and the burst size is 100. If absolute values are used in the table instead of relative values, then a separate table will be used for each buffer.

The procedure presented with reference to FIG. 5 makes it possible in theory for connections of top priority to use the total capacity of the link, because they have privileged access to the transmission time slots. This means that e.g. a strong overload in this queue resulting from a failure situation in the traffic control function of the first queue will be rough on queues of lower priority by preventing their access to transmission time slots. This can be avoided by using leaky buckets LB1, LB2, . . . LBn to monitor and control traffic flows of different priority classes. The leaky buckets are calculators of a length twice the associated buffer length B and they may also be used for traffic measurements.

Since the leaky bucket length is 2·B, the control function derived from the CAC criterion of the buffers can be applied directly to them. Leaky buckets are used to force connections of a higher priority to give to connections of a lower priority the capacity which is reserved for them.

Figure 6:
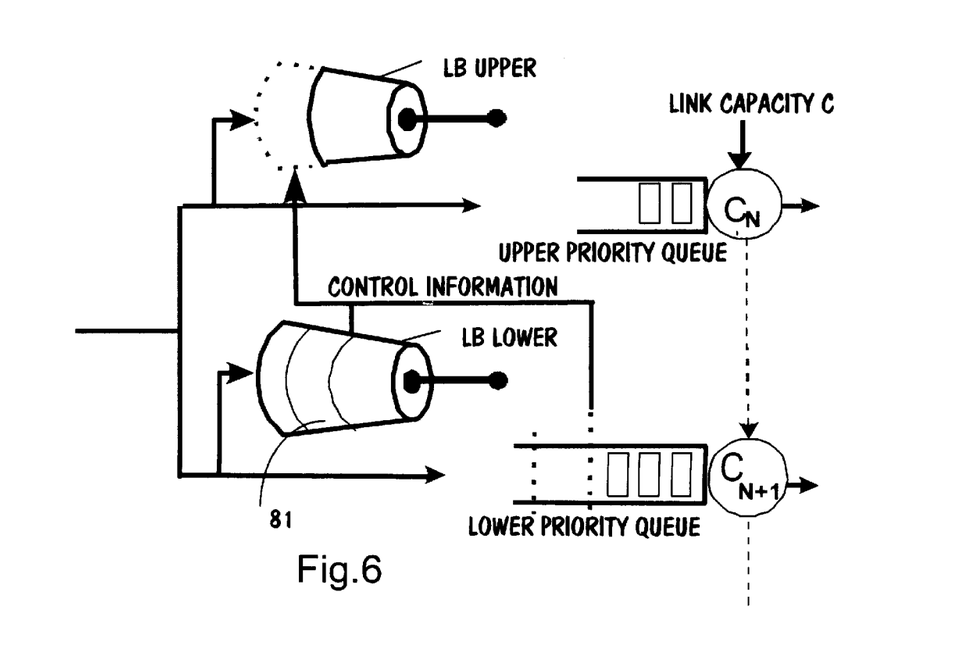
FIG. 6 shows buffer control.

FIG. 6 illustrates the operation of leaky buckets. In the figure there are two buffers $B_{upper}$ and $B_{lower}$ of successive priorities and their respective leaky buckets $LB_{upper}$ and $LB_{lower}$. The lower buffer $B_{lower}$ has a threshold value of 82 and the lower leaky bucket $LB_{lower}$ has a threshold value of 81. Since the buffer and bucket are of the same size, the threshold values are also the same. These limit values are used for controlling the size of the upper buffer. The filling degree of the lower buffer is monitored. If the filling degree is incomplete, the control will give more capacity to the upper buffer although cells departing from the upper buffer take more capacity Cn than is intended for them. If the number of cells in the queue of the lower buffer has reached the threshold value of 82, then the control information will prevent the upper buffer from receiving and sending more cells, whereby overflow will take place in the upper buffer and cells are allowed to get lost.

Traffic measurements can be used for extending the utilisation ratio of the control method according to the invention. Buckets controlling the traffic flow can also be used for traffic measurements, because they produce such information which is directly proportional to the CAC criterion. Since the effective capacity values of the tables used when making the CAC decision are probably very cautious, more connections may be placed in the link, when the system is monitored with the aid of buckets in real time. Samples of buckets may also be taken at regular intervals and conclusions may be drawn as regards the state of the system by using the weighted running mean of samples.

The benefit from the method according to the invention increases with a shorter on/off period of the source. The biggest improvement over a case with no buffers is obtained with sources, which have a very small transmission probability, that is, with sources transmitting bursts of short duration but of high transmission rates. The achieved benefit compared to a buffer-less case when calculating with large deviation approximation is not very big when the burst of the connection will go in its entirety into time window 2·T, but with an increasing buffer size a drastic improvement can be seen at once. This means that the duration of the burst is of greater significance than the number of cells in the burst.

Figure 8:
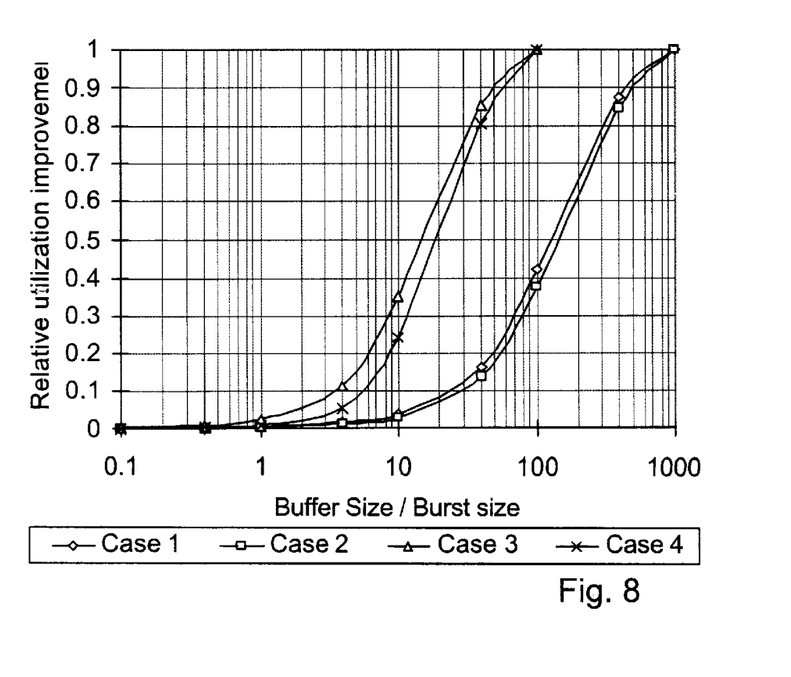
FIG. 8 shows relative improvements in utilization ratio.

The aforesaid is illustrated by the set of diagrams in FIG. 8, wherein the y axis is the relative improvement in utilisation ratio scaled in such a way that the zero level corresponds to the utilisation ratio of the buffer-less case calculated with large deviation approximation and the 100% level corresponds to the real 100% level.

There are four different curves in the figure, that is, four different connections with connection parameters as shown in Table 1:

TABLE 1

|  | Case 1 | Case 2 | Case 3 | Case 4 |
| --- | --- | --- | --- | --- |
| C/PCR | 100 | 100 | 10 | 10 |
| P(on) | 0.1 | 0.1 | 0.1 | 0.1 |
| $P_{loss}$ | $10^{-4}$ | $10^{-9}$ | $10^{-4}$ | $10^{-9}$ |
| U(LD) | 0.76 | 0.58 | 0.32 | 0.13 |

It can be seen that the required probability of cell loss does not have any significant effect on the benefit which can be achieved through buffering, but the traffic parameters are more decisive.

What is claimed is:

1. A method of forming a table for use in connection admission control (CAC) for a packet switched telecommunication network, especially for an ATM network, comprising:

requesting, by a traffic source, a connection from a network, providing, by a traffic source, parameter values describing the traffic sources' traffic to a network junction having a buffer, wherein a buffer length B and a capacity C of a transfer connection going out from the junction are chosen, and wherein a buffer depletion time T is B/C, forming a table, wherein each line in the table having predetermined values for traffic parameters, the traffic parameters including a peak cell rate, a sustainable cell rate, a burst tolerance and a probability of cell loss, computing traffic parameter ratios using the traffic parameters, and using the computed traffic parameter ratios to determine an equivalent capacity, wherein the equivalent capacity is generated by using a large deviation approximation and by using a time window length having a time which is twice a buffer depletion time, and wherein values proportional to the traffic parameters and the computed equivalent capacity are in the table.

2. The method as defined in claim 1, wherein the computed traffic parameter ratios include:

a transfer connection capacity C/peak cell rate value, a buffer length B/burst tolerance, a sustainable cell rate/peak cell rate value, and a probability of cell loss value.

3. A method of defining the equivalent capacity required by a traffic source in a packet switched telecommunication network, especially an ATM network, comprising:

requesting, by the traffic source, a connection from a network junction, providing traffic sources' traffic parameters including peak cell rate value, a sustainable cell rate, a burst tolerance and a probability of cell loss, wherein the network junction is provided with at least one buffer having a length B and from which cells are transmitted to a transfer connection having a capacity C, wherein in response to the request for connection:

searching a predetermined table for parameters corresponding to the traffic parameters stated by the traffic source, wherein on each line of the table there is a combination of different traffic parameters and an equivalent capacity, wherein the equivalent capacity is computed by using the traffic parameters, a large deviation approximation, and a time window 2·T, which is twice a buffer depletion time T, reading the equivalent capacity from the line, adding the obtained equivalent capacity to the equivalent capacities of existing connections to form a total capacity, and admitting the request for connection of the traffic source if the total capacity is less than the capacity C of the transfer connection, otherwise the request for connection is dismissed.

4. The method as defined in claim 3, wherein traffic parameter ratios are computed from the traffic parameters before the traffic parameter ratios are sought from the table.

5. The method as defined in claim 4, wherein the traffic parameter ratios formed from the traffic parameters include:

a transfer connection capacity C/peak cell rate value, a buffer length B/burst tolerance, a sustainable cell rate/peak cell rate value, and a probability of cell loss ($P_{LOSS}$).

6. The method as defined in claim 3, wherein when several buffers are associated with the junction, each of which receives cells according to the buffer's own service level and which have a predetermined share of the total capacity of the transfer connection, a table is attached to each buffer, wherein the table is formed by using a concerned buffer length (B1, B2, . . . ) and the buffer's share (C1, C2, . . . ) of the total capacity C.

7. The method as defined in claim 3, wherein when several buffers are associated with the junction, each of which receives cells according to the buffer's own service level and which have a predetermined share of the total capacity of the transfer connection, the buffers will use a common table.

8. The method as defined in claim 6, wherein the decision to admit a connection is made separately for each buffer using the attached table.

9. The method as defined in claim 6, wherein if the buffer receiving cells is of the highest priority and there are no cells waiting for transmission in the transmission time slot allocated to that buffer, a next buffer will be sought in a lower priority level where there is a cell waiting for transmission, wherein transmission is transferred to the lower priority buffer.

10. The method as defined in claim 6, wherein with each buffer (B1, B2, . . . ) is associated a calculator, that is, a leaky bucket (LB1, LB2, . . . ), monitoring the traffic flow of the buffer, the length of which is equal to the length of the associated buffer, and a control function of the leaky bucket is derived from the connection admission criterion of the associated buffer.

11. The method as defined in claim 10, wherein limit values are established in the leaky bucket and in the associated buffer for use in controlling the size of the buffer which is of the next higher priority so that if the buffer's filling degree is below the limit value, the control will temporarily give more capacity to the upper buffer, but if the buffer's filling degree exceeds the limit value (82), the control will prevent the upper buffer from receiving cells, whereby overflow of this buffer will occur.

* * * * *